United States Patent [19]

Reiling

[11] Patent Number: 5,525,020

[45] Date of Patent: Jun. 11, 1996

[54] COLLECTOR CONTAINER FOR REUSABLE WASTE MATERIALS

[75] Inventor: Bernhard Reiling, Harsewinkel, Germany

[73] Assignee: Bernard Reiling Glas-Recycling GmbH (German corp.), Harsewinkel, Germany

[21] Appl. No.: 240,722

[22] PCT Filed: Nov. 4, 1992

[86] PCT No.: PCT/EP92/02530

§ 371 Date: Jun. 21, 1994

§ 102(e) Date: Jun. 21, 1994

[87] PCT Pub. No.: WO93/10026

PCT Pub. Date: May 27, 1993

[30]     Foreign Application Priority Data

Nov. 15, 1991  [DE]  Germany ................ 41 37 594.7

[51] Int. Cl.⁶ .................................................. B65B 69/00
[52] U.S. Cl. .................. 414/422; 220/909; 220/23.8; 232/43.1
[58] Field of Search ................ 232/43.1, 43.5; 270/909, 751, 23.8, 503, 908; 414/403, 406, 486, 487, 626, 736, 422

[56]          References Cited

U.S. PATENT DOCUMENTS

| | | | |
|---|---|---|---|
| 3,141,609 | 7/1964 | Roth | 232/43.1 |
| 4,975,019 | 12/1990 | Cate | 232/43.1 |
| 5,035,563 | 7/1991 | Mezey | 220/909 |
| 5,244,218 | 9/1993 | Irwin | 220/909 |

FOREIGN PATENT DOCUMENTS

| | | | |
|---|---|---|---|
| 338492 | 11/1990 | European Pat. Off. | |
| 3413937 | 4/1984 | Germany | |
| 3607780 | 9/1987 | Germany | 220/909 |

*Primary Examiner*—Flemming Saether
*Attorney, Agent, or Firm*—Charles E. Baxley

[57]              ABSTRACT

A collector container, for recyclable materials, is formed around a central body. At least three partial containers each has a closed outer side and a closed top and a closed bottom, as well as an inner side provided with an exit opening therein. Each of the partial containers also is provided with an entrance opening in an upper portion thereof for receiving a recyclable material therein. The outer sides of the partial containers in their closed positions combining to describe a cube. The partial containers extending to mid-planes of the cube with the central body arranged along a line of intersection of the mid-planes. Each of the partial containers is hingedly joined to the central body between a closed position wherein the inner side engages the wall means to close that partial container's exit opening, and an open position wherein the material container's inner wall is tilted away from the central body to expose the exit opening of that partial container downwardly for dumping said recyclable material therefrom. A hoisting mechanism is provided for lifting selectively each of the partial containers between their respective closed and open positions.

7 Claims, 5 Drawing Sheets

COLLECTOR CONTAINER FOR REUSABLE WASTE MATERIALS

FIELD OF INVENTION

The present invention relates to a collector container for reuseable waste materials.

DESCRIPTION OF RELATED PRIOR ART

Such a collector container is described in DE-34 13 937 A1, in which it is referred to as a hinged-lid container because the two containers that it comprises can be opened and closed relative to each other in a synchronous, mirror-image movement. To this end, in the known collector container, tops of the two containers are articulated directly with each other, and in a closed position open sides of the constituent containers lie directly against each other. Because of this arrangement, when in the closed position, these two constituent containers form a single and continuous storage space, which is a disadvantage with respect to accommodating those types of waste that are to be separated from each other. In particular, a collector container of this type is not suitable for holding variously coloured glass fractions; for example, using such a container, it is not possible to pre-sort clear and coloured glass.

The German utility model DE-G 88 05 173.0 describes a similar collector container that incorporates a separator flap that is arranged inside the container between the open sides of the two constituent containers that are adjacent to each other. When the flaps of the two constituent containers are raised synchronously with their open sides away from each other, the separator flap first holds the open side of the one constituent container closed, to a pre-determined opening angle, so that initially the other constituent container can be emptied. If the two constituent containers are tilted further apart, the separator plate unblocks the open side of the second constituent container, which makes it possible to empty the two constituent containers separately. The disadvantage of this known arrangement lies in the fact that it is only suitable for two constituent containers that can be tilted directly towards each other; a complicated mechanism is required to control the separator flap; and the sequence by which the two constituent containers are emptied cannot be selected as desired.

German utility model DE-G 91 02 154.5 describes a collector system for discrete collection of individual materials; in this collector system, a plurality of individual containers are arranged on a central receiver body. Each individual container can be manipulated separately and it has to be removed from the receiver body in order to be emptied by way of a top flap.

SUMMARY OF THE INVENTION

The present invention presents a collector container of the type described, which can comprise two or more constituent containers that can be emptied individually, independently of each other, and in any sequence.

It is essential to the present invention that the individual constituent containers of the collector container be articulatable independently of each other on a central receiver body, and for this reason can be opened towards the bottom by tilting their open sides away from the receiver body. When this is done, the wall sections of the receiver body keep the remaining constituent containers closed without any risk of unintentional and self-actuated opening, because when the particular constituent containers are opened and closed the relative movement takes place only between this constituent container and the receiver body, but not between the different constituent containers.

In an advantageous configuration according to the present invention, a constituent container has an overall, essentially cubic shape and comprises three or four constituent containers; lines of separation between these constituent containers, run in longitudinal and transverse mid-planes of an essentially cubic basic body when the collector container is in the closed position. Thus, the central receiver body is arranged at the intersection of lines of separation in order to achieve a favourable position for the centre of gravity. The axes of the hinges between the tops of the constituent containers and the receiver body can be arranged so as to be parallel and/or diagonal to the lines of separation. In the latter case, the danger of the constituent containers jamming against each other is reduced and emptying openings on the top could be enlarged in that the open side and thus the emptying opening of the particular constituent container extends beyond the inner corner edge.

In order that the receiver body can fulfill its separating function without significantly reducing the receiving volume of the constituent containers, it is advantageous that it have a central column from which wall arms extend radially and which, at least in part, form the wall sections that close off the open sides of the constituent containers. The column of the receiver body can extend to the whole height of the constituent containers, in the tops and bottoms of which there are then negative contours that are formed so as to enclose the column tightly.

In order to keep the dimensions of the receiver body small, on one hand, and, on the other hand, to achieve a tight closure of the open sides or the emptying openings in the closed position of the constituent containers, it is advantageous that wall elements that define the emptying openings at the side be arranged on the open side of the constituent containers; in the closed position, these are overlapped by the wall sections or the wall arms of the receiver body.

In order to arrive at a stable closed position, the hinges on the tops of constituent containers are as close as possible to the central receiver body. To this end, it is advantageous if the receiver body has at the upper end of its column a head plate that projects radially beyond it, the hinges for the constituent containers being arranged along the edges of the head plate. Then, even in the case of a rigid connection, it is possible to stabilize the radially projecting wall arms of the receiver body by way of the head plate.

In the emptying process, the whole of the collector container is raised over the central receiver body by the elevator. To this end, it is expedient that at the upper end of the receiver body there be a coupling system for a load suspension device of the elevator; this coupling system can, in particular, be arranged on the top of the head plate of the receiver body.

In an advantageous development of the present invention, in addition, the coupling system of the receiver body and the load suspension device of the elevator can be locked by means of positively shaped contours when the coupling counter-elements of the elevator are aligned with the coupling elements at the top; and can be released from each other when not so aligned. First, then, one must first securely join the collector container to the elevator by way of the coupling system on the top of the receiver body so that then, after lifting, one can tilt each constituent container open by operating the particular coupling counter-element of the elevator. To this end, it is advantageous that the coupling system of the receiver body incorporate an elongated insertion slot with an undercut area and the load suspension device of the elevator have a hammer head that is matched thereto and which can be positively locked, with the elevator being traversable about a vertical axis that passes through the hammer head. Thus, as long as the hammer head is not secured positively by virtue of its shape to the coupling system of the receiver body, it is not possible to open the constituent containers. An effective safety device lies in the fact that the coupling system of the receiver body has on its underside, in the area of the undercut, a transverse groove that is open at the bottom and which is perpendicular to the longitudinal direction of the insertion slot in which the hammer head of the elevator engages positively during the raising process. To this end, it is advantageous that the undercut extend on both sides on the underside of the coupling system, proceeding from the longitudinal direction of the insertion slot through an angle of rotation of 90° for the hammer head of the elevator, and are defined by a flank side of the transverse groove that is extended downwards, as a stop for the hammer head.

An advantageous configuration of the coupling counter-elements of the elevator are hooks that can be pivoted in a vertical plane between an outer spread position and a position that is retracted inwards to the load suspension device; said hooks are arranged so as to project essentially downwards on the elevator, around the load suspension device at the same angular spacing as the coupling elements on the tops of the constituent containers and have hook projections that are oriented inwards towards the load suspension device. The coupling elements on the top of the constituent containers are lifting eyes that are matched to the hook-shaped coupling counter-elements of the elevator.

BRIEF DESCRIPTION OF THE DRAWINGS

The present invention will be described in greater detail below on the basis of an embodiment shown in the drawings. These drawings show the following.

BEST WAY TO EXECUTE THE INVENTION

Figure 1:
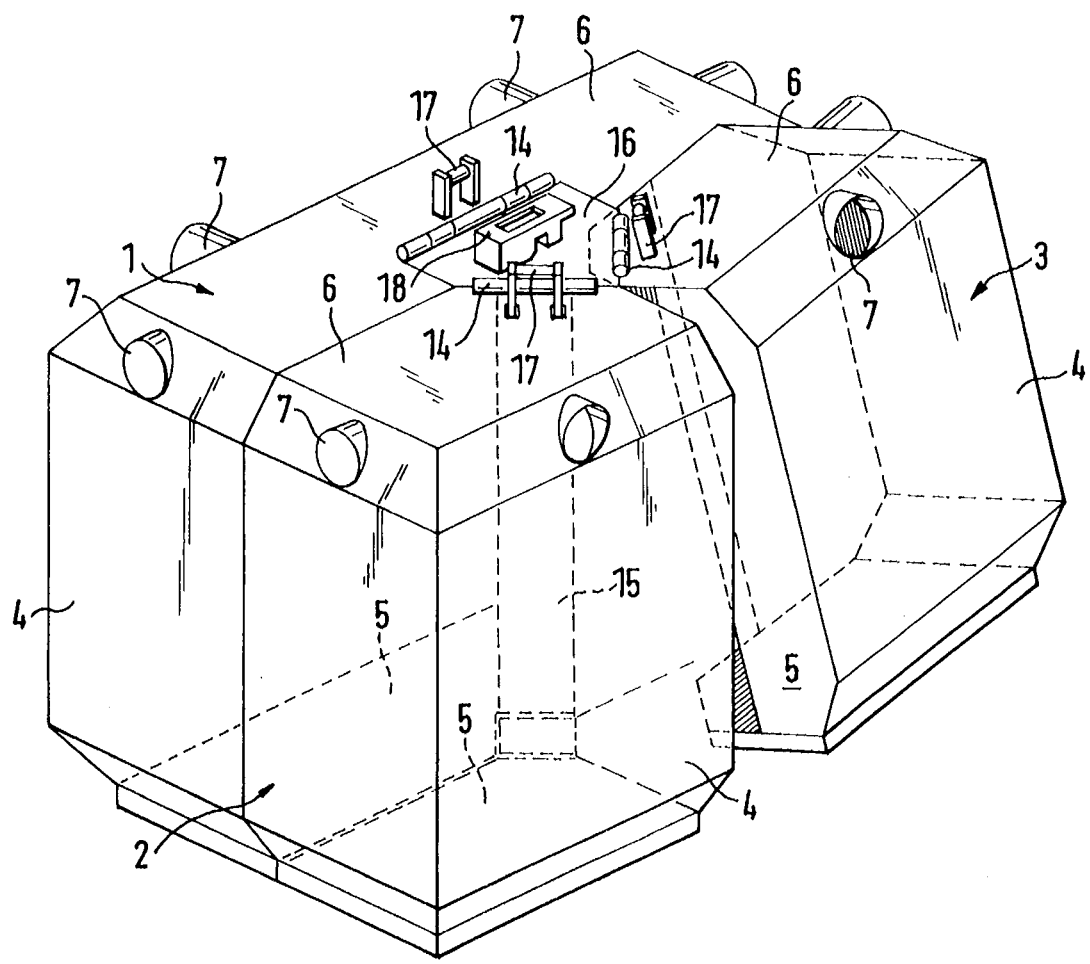
FIG. 1: an oblique perspective view from above of a collector container, with a constituent container tilted outward.

FIG. 1 shows a details of a collector container that comprises three constituent containers 1, 2, 3 that complement each other. The collector container is of an overall, essentially cubic shape, the larger of the three constituent containers, namely the constituent container 1 accounting for half the total volume of the collector container, and the two smaller constituent containers, namely the constituent containers 2 and 3, each accounting for a quarter of the total volume. Lines of separation 22 (see FIG. 4) between the constituent containers, 1, 2, and 3 are so arranged that they extend along vertical middle planes of the total collector container, which intersect each other at right angles, so that the constituent containers 1, 2, and 3 have rectangular cross-sectional shapes. The constituent containers 1, 2, and 3 have essentially continuous outer sides and the interiors of these constituent containers are accessable from outside only through insertion openings 7 that are positioned near their tops. Thus, the constituent containers 1, 2, and 3 have closed outer sides 4, a closed bottom 5 and a closed top 6. Material that is to be collected, in particular glass, can be inserted, separated according to colour, into the constituent containers 1, 2, and 3 through the insertion openings 7; the constituent containers 1, 2, and 3 are emptied from the inside, for which objective the constituent containers 1, 2, and 3 can be tilted outward relative to each other, thereby forming an emptying gap that is open at the bottom.

Figure 2:
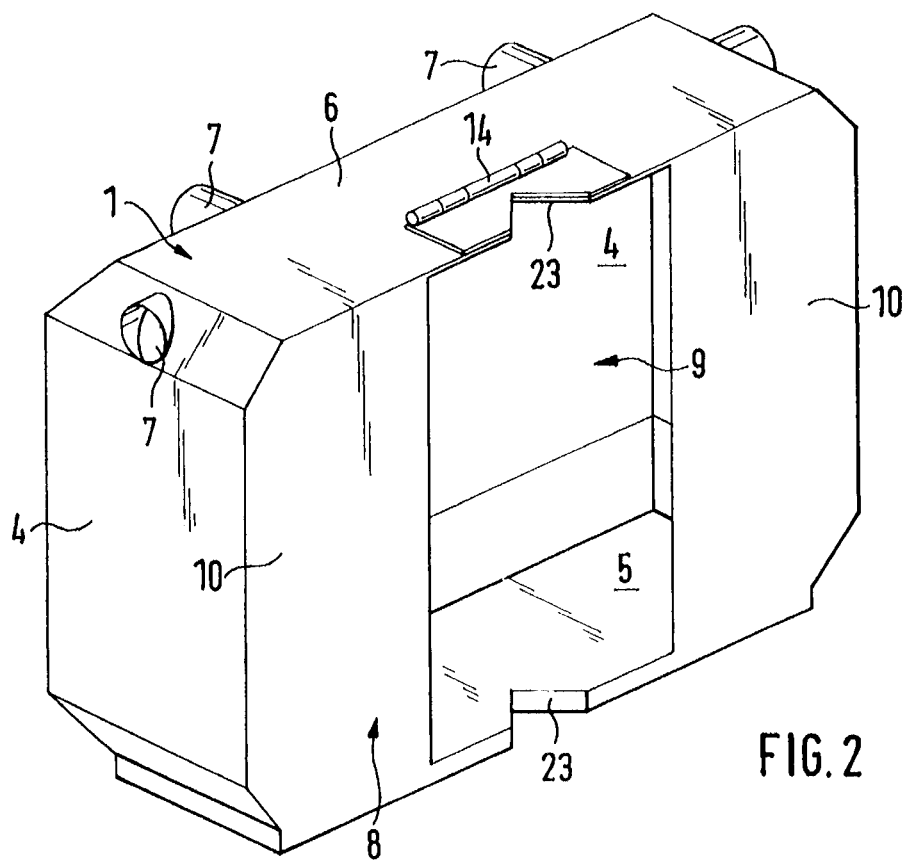
FIG. 2: a perspective view of the half constituent container of a collector container as in FIG. 1.
Figure 3:
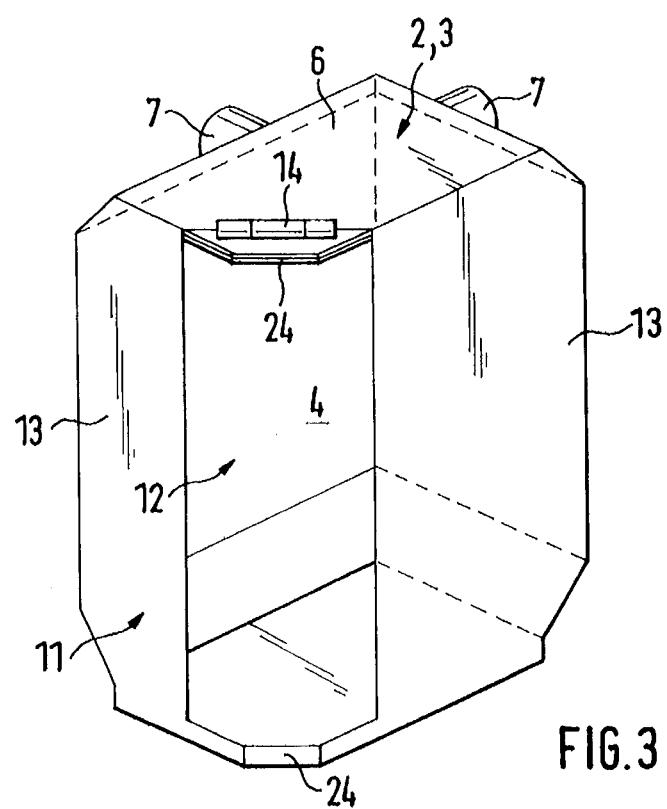
FIG. 3: a perspective view of the quarter constituent container of a collector container shown in FIG. 1.

FIG. 2 shows the inside open side 8 of the constituent container 1; this open side 8 has a central emptying opening 9 that is defined at its sides by the wall sections 10. The open side 8 of the half constituent container 1 extends across a long side, and the emptying opening 9 can be configured to any desired size by enlarging or reducing the wall sections 10. By inclining the bottom 5 towards the emptying opening 9, it is possible to achieve complete removal of the collected material from the constituent container 1. In the same way, FIG. 3 shows the inner open side 11 of one of the smaller constituent containers 2 or 3 and this open side 8 extends across an inside corner edge. Accordingly, here there is an emptying opening 12 that runs along the corner edge and is defined by wall sections 13 that extend at right angles to each other.

In FIGS. 2 and 3, on the top 6 of the constituent containers 1, 2, and 3, there are joints 14 that are built in a manner of hinges, which are each offset from the vertical midline axis of the particular constituent container 1, 2, or 3 towards the side of the emptying opening 9 or 12, respectively. As is also shown in FIG. 1, the constituent containers 1, 2, and 3 are suspended on a central receiver body 15 by way of these joints 14, when the axis of the joint 14 in the half constituent container 1 is parallel to the longitudinal midline plane, and in the case of the smaller constituents 2 and 3, is parallel to the diagonal midline plane. Each of the constituent containers 1, 2, and 3 can thus be tilted out relative to the central receiver body 15 so as to form an emptying gap that is open at the bottom, as is shown in FIG. 1, on the right-hand side, for the rear small constituent container 3. The constituent containers are opened by a hoisting mechanism, which will be described in greater detail below.

At its top, the central receiver body 15 has a head plate 16 that extends radially, relative to its longitudinal axis. The constituent containers 1, 2, and 3 are articulated onto this head plate 16 at their tops through hinge joints 14 when an eccentric arrangement relative to the vertical centre of each individual constituent container 1, 2, and 3 to ensure that when the constituent containers suspended the open sides 8, 11, respectively of the constituent containers 1, 2, or 3 are closed automatically by the effects of gravity so as to lie against the central receiver body 15. A tensile force that acts against the closing force must be applied in order to swing the constituent containers 1, 2, and 3 outwards and this tensile force has to act on the coupling element 17 on the tops 6 of the constituent containers 1, 2, and 3; these are arranged on that side of the particular joint 14 that is remote from the central receiver body 15 or from its top head plate 16. A coupling device 18 that is arranged on the top of the head plate 16 of the receiver body 15 is used to mount the elevator on the receiver body 15.

Figure 4:
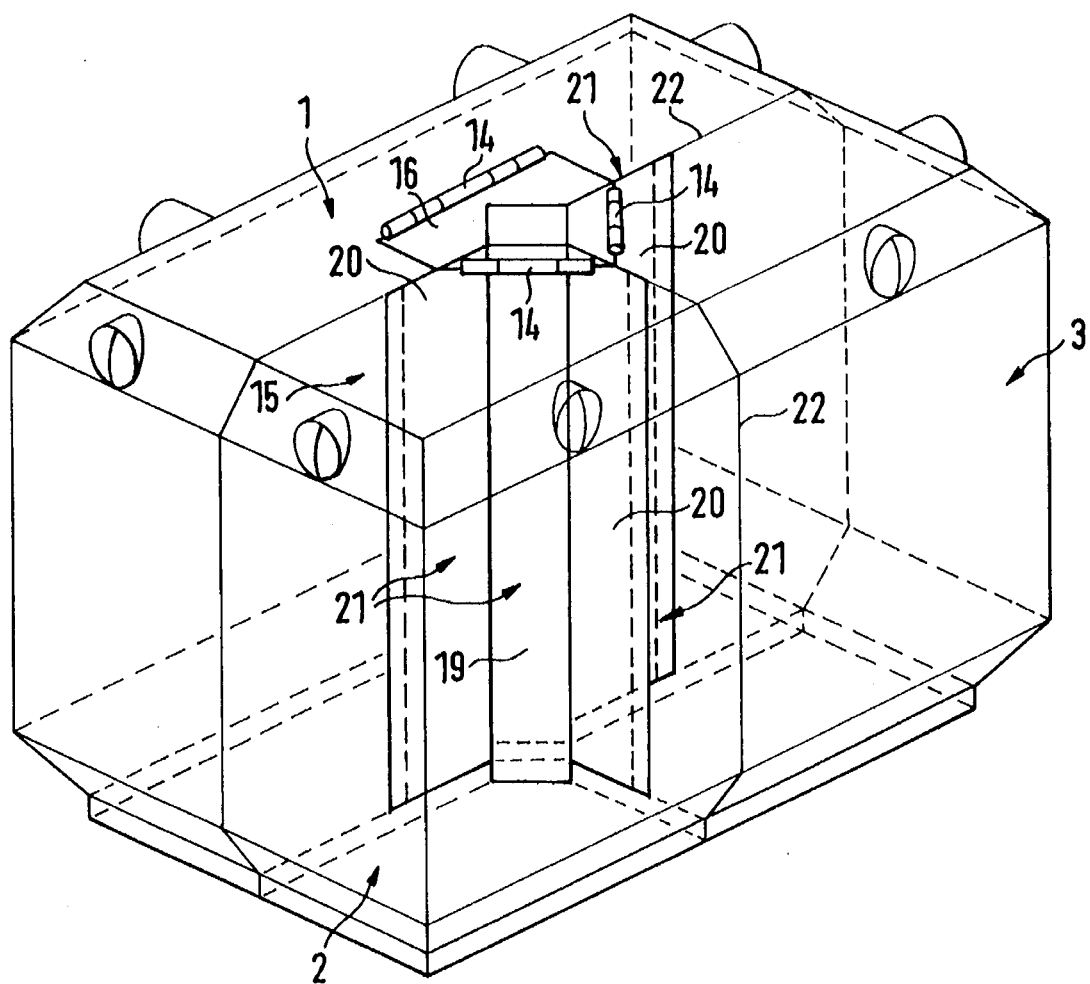
FIG. 4: a perspective view of the central receiver body of the collector container, showing outlines of the container.

The particular configuration of the receiver body 15 is shown in FIG. 4. It incorporates a central column 19 on which radially projecting wall arms 20 are arranged between the constituent containers 1, 2, and 3 according to the shape of the lines of separation 22 between the constituent containers 1, 2, and 3. These wall arms 20, together with the outer sides of the central column 19 of the receiver body 15 form wall sections 21 and these cover completely the emptying openings 9, 12 in the open sides 8, 11 when the constituent containers 1, 2, and 3 are in the closed position. When this is done, the wall arms 20 overlap the wall sections 10, 13 of the constituent containers 1, 2, and 3 that define the emptying openings 9, 12 at the sides. The rectangular column 19 of the receiver body 15 is enclosed closely by the tops 6 and the bottoms 9 of the constituent containers 1, 2, and 3 when in the closed position, and to this end there are appropriately V-shaped negative shapes 23 formed in the top 6 and the bottom 5 of the half constituent container 1 and there are bevelled faces as negative shapes 24 on the inner corners of the bottoms 5 and the tops 6 of the smaller constituent containers 2, 3.

Figure 5:
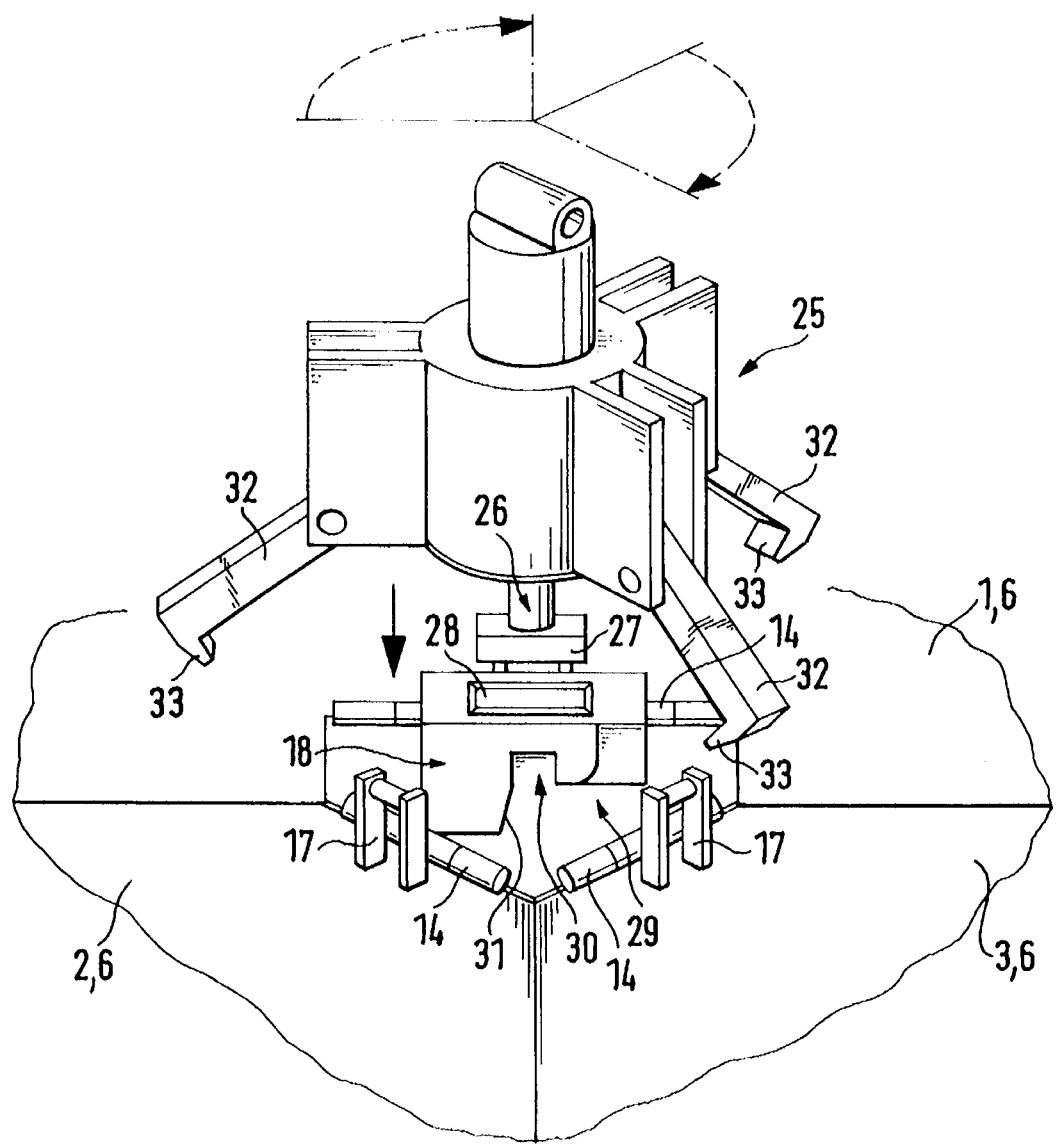
FIG. 5: a perspective view of the hoisting mechanism for the collector container aligned with a corresponding coupling device on top of the central receiver body.
Figure 6:
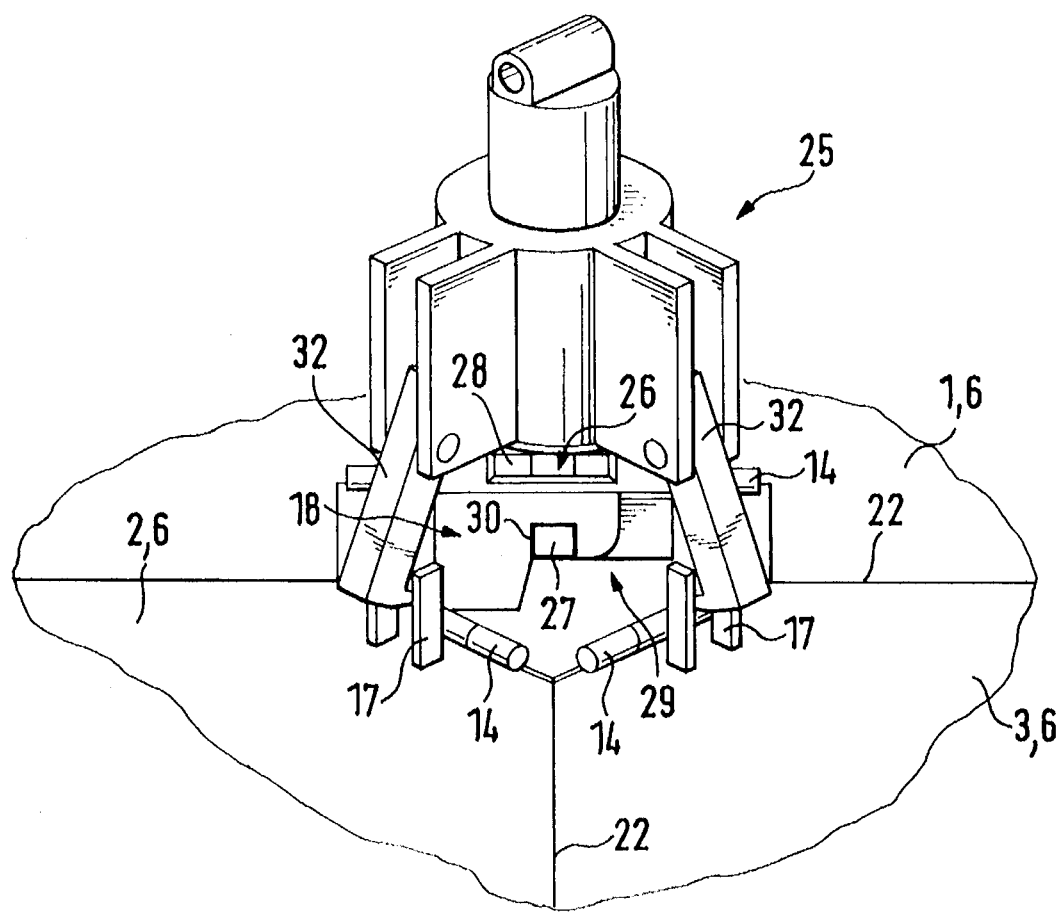
FIG. 6: a view, corresponding to FIG. 5, of the hoisting mechanism with coupler counter-elements engaged with coupling elements on the tops of the constituent containers.

The hoisting mechanism 25 that is couplable to the coupling device 18 of the receiver body 15 can be seen in detail in FIGS. 5 and 6. At its lower end, the hoisting mechanism 25 has a load suspension device 26 that extends coaxially downwards and this is configured as a hammer head 27 at its lower end. The coupling device 18 is provided with an elongated insertion slot 28 that opens out at the bottom into a straight or undercut area 29, in the vicinity of which the hammer head 27 of the load suspension device 26 can be rotated into a position that is perpendicular to the insertion slot 28. The insertion slot 28 is, at least in its longitudinal direction, matched exactly to the hammer head 27 of the load suspension device 26 with respect to its shape, in order that the elevator 25 assumes a specific rotated position when the hammer head 27 passes through the insertion slot 28. On its lower side, the coupling device 18 has a transverse groove 30 that intersects the insertion slot 28 at its mid-point, and this opens out to the undercut area 29. This transverse groove 30 accommodates the hammer head 27 when, after passing through the insertion slot 28, it is rotated with the whole of the elevator 25 through 90° and the hoisting mechanism device 25 is subsequently raised. This arrangement locks the hoisting mechanism 25 to the coupling device 18 of the receiver body 15, as can be seen in FIG. 6. In order that the hammer head 27 can be introduced securely into the transverse groove 30 on the underside of the coupling device 18 during the raising process, the side 31 of the transverse groove 30 that is opposite the undercut section 29 is extended downwards in order to form a stop for the hammer head 27. Because the hammer head 27 has projecting sections on both sides relative to the vertical axis of rotation of the elevator 25, the coupling device 28 is formed on its underside, on both sides, with rotationally symmetrical and opposing free-cut sections.

Coupling counter-elements 32 are arranged so as to be pivotable on the hoisting mechanism 25, around the central receiver 26, and their angular spacing corresponds to the angular spacing between the coupling element 17 on the tops 6 of the constituent containers 1, 2, and 3. In the case of the coupling counter-elements 32, these are hooks that are arranged on the elevator 25 so as to extend essentially downwards; they can assume a spread position in which they are inclined outwards, as is shown in FIG. 5, and a position in which they are pivoted inwards, as is shown in FIG. 6. On their inner sides, towards the load suspension device 26, the coupling counter-elements 32 are provided with hooked projections 33 which, when in the innermost position, engage with the coupling elements 17 that are on the tops of the particular constituent containers 1, 2, 3 and which are configured in the manner of suspension eyes. Each of the coupling counter-elements 32 of the elevator 25 can be moved from the outer spread position into the inner position by a drive system (not shown herein) and then the bottoms 5 of the particular constituent container 1, 2, or 3 can be tilted away from the central receiver element 15 when the coupling element 17 is moved by the coupling counter-elements 32. FIG. 6 shows the two visible coupling counter-elements 32 of the hoisting mechanism 25 engaged with the coupling elements 17 of the two constituent containers 2 and 3, but it must be understood that as a rule, which is to say during the emptying process, each of the constituent containers 1, 2, or 3 can be opened in and of itself by appropriate control of the coupling counter-elements 32 on the hoisting mechanism 25.

I claim:

1. In combination a collector container and related hoisting mechanism for recyclable materials and comprising:

a central body having wall means, at least three partial containers each having a closed outer side and a closed top and a closed bottom as well as an inner side provided with an exit opening therein, each of the partial containers further provided with an entrance opening in an upper portion thereof for receiving one of the recyclable materials therein, each of the partial containers having in the vicinity of its top a joint that connects said partial container hingedly to the central body, each of the partial containers movable about its related joint between:

a closed position wherein the inner side engages the wall means of the central body to close that partial container's exit opening, and an open position wherein the partial container's inner wall is tilted away from the wall means of the central body to expose the exit opening of that partial container downwardly for discharge of its recyclable material therefrom, a coupling loop connected to each of the partial containers and spaced from the central body outward of the joint, a hoisting mechanism connectable selectively to each of the coupling loops for moving selectively each of the partial containers between their said respective closed and open positions, the outer sides of the partial containers in their said closed positions combining to describe a cube, the partial containers in their said positions defining therebetween planes of separation which extend along longitudinal and transverse vertical mid-planes of the cube with the central body being arranged along a line of intersection of the mid-planes.

2. The combination as claimed in claim 1, characterized further in that each of the joints between the partial containers and the central body defines a joint axis.

3. The combination as claimed in claim 2, characterized further in that the top of at least a first one of the partial containers describes a joint axis extending diagonally along a corner edge of the top of said first one of the partial containers.

4. The combination as claimed in claim 3, further characterized in that:

the central body comprises a central column, the wall means comprises a wall section corresponding to each of the partial containers, the wall means connected to the central column, and each of the wall sections overlapping the exit opening of its partial container in the closed position.

5. The combination as claimed in claim 4, further characterized in that cut-outs are provided from the tops and bottoms of each of the partial containers.

6. The combination as claimed in claim 5, further characterized in that the central column has a headplate connected rigidly thereto, each of said joints arranged between its related partial container and edges of the headplate.

7. The combination as claimed in claim 6, further characterized in that the coupling loop for at least one of the partial containers and the hoisting mechanism are detachably attachable to each other.

* * * * *